May 8, 1923.

J. E. HUGHES

OPTICAL PLIERS

Filed June 30, 1920

1,454,475

INVENTOR
John E. Hughes
BY Thomas L. Wilder
ATTORNEY

Patented May 8, 1923.

1,454,475

UNITED STATES PATENT OFFICE.

JOHN E. HUGHES, OF UTICA, NEW YORK.

OPTICAL PLIERS.

Application filed June 30, 1920. Serial No. 392,963.

*To all whom it may concern:*

Be it known that I, JOHN E. HUGHES, a citizen of the United States, residing at Utica, in the county of Oneida and State of New York, have invented certain new and useful Improvements in Optical Pliers, of which the following is a specification, reference being had therein to the accompanying drawings.

My invention relates to optical pliers, and I declare the following to be a full, clear, concise and exact description thereof sufficient to enable anyone skilled in the art to which it appears to make and use the same reference being had to the accompanying drawings in which like reference characters refer to like parts throughout the specification.

The object of the invention is to provide a pair of pliers adapted especially for use in removing the metallic bridge or end pieces from zylonite rims of a pair of eye glasses or spectacles. To this end the pliers are made so as to fit about certain parts of the frame of the eye glasses and with special edges adapted to securely grip the parts of the metallic bridge, whereby said parts can be bent away from the contiguous surface of the zylonite rim in an easy manner and without injury to either the bridge piece or the rim. This operation will allow the renewal of either the bridge piece or rim in the event that either of said parts become broken.

The object will appear by referring to the drawings in which.

Figure 1:
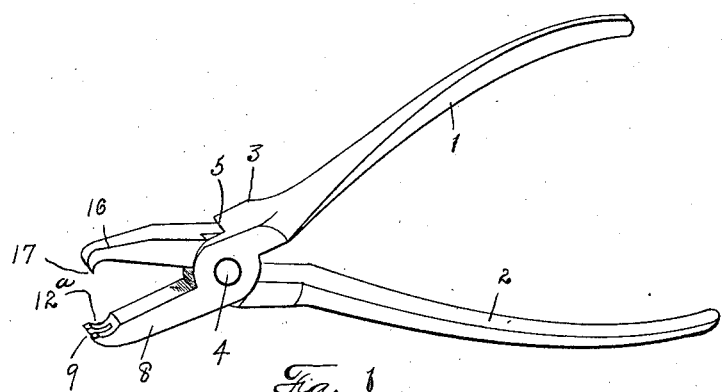
Fig. 1 is a perspective view of the pliers.
Figure 2:
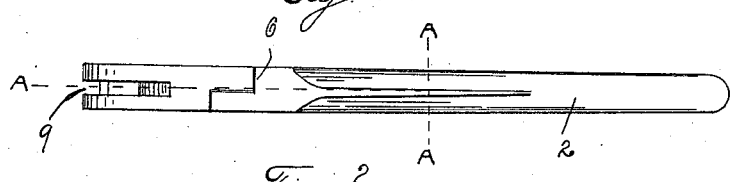
Fig. 2 is a plan view of the pliers looking up from beneath with reference to Fig. 1.
Figure 3:
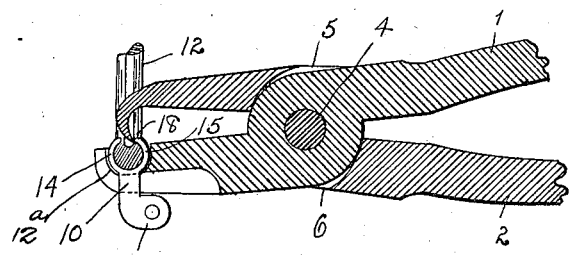
Fig. 3 is an enlarged detail fragmentary view, showing a section taken on the line A—A—A of Fig. 2; and illustrating the gripping jaws about to perform their function.
Figure 5:
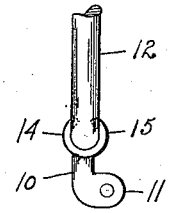
Fig. 5 is an enlarged detail fragmentary view of a zylonite rim, showing the metallic bridge attached thereto.

Referring more particularly to the drawings, a pair of pliers having lever arms 1 and 2 is shown at 3. The arms 1 and 2 are fulcrumed upon a shaft 4 and are recessed at 5 and 6, whereby to fit together in the usual well known manner of pliers. The lower gripping end 8 formed integral with the arm 1 is provided with a longitudinal open recess 9 adapted to straddle the bow part 10 of the bridge piece 11 and is provided also with the transverse semi-circular recess $12^a$ adapted to conform to the cylindrical shape of the parts 14 and 15 of the bridge 11, which parts embrace the zylonite rim from opposite sides thereof, in order to hold the bridge piece 11 fast to said rim 12.

Figure 4:
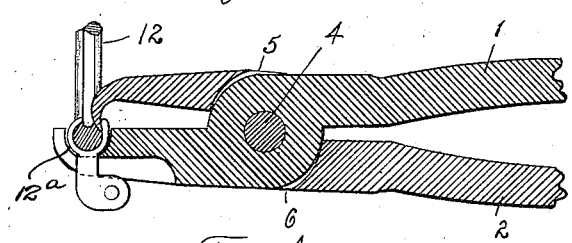
Fig. 4 is an enlarged detail fragmentary view, showing a section taken also on the line A—A—A of Fig. 2 and illustrating the jaws just after they have performed their function.
Figure 6:
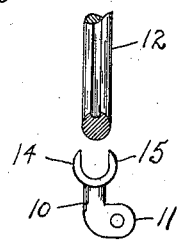
Fig. 6 is an enlarged detail fragmentary view of a portion of the zylonite rim and of the bridge piece with its parts in position to be attached to said rim.
Figure 7:
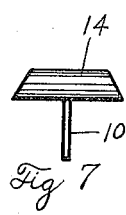
Fig. 7 is a side elevation of the bridge piece employed, showing the same enlarged.

The upper gripping end 16, formed integral with the arm 2, is made with a hook 17 adapted to catch or slip in between the upper free edge 18 of each of the parts 14 and 15 and the adjacent surface of the zylonite rim, whereby said parts 14 and 15 can be bent back away from the rim 12, as part 15 is bent in Fig. 4, to release said rim 12, when occasion desires it.

In using the pliers 3, the operator will dispose the gripping ends 8 and 16 thereof in such manner that the recess 9 will straddle the bow part 10 of said bridge piece 11 and the lower surface of the cylindrically formed parts 14 and 15 will rest in the semi-circular recess 12. The pliers 3 will be manipulated then in such manner that the hook 17 of the upper gripping end 16 will engage the free edge 18 of one of the parts 14 and 15, whereupon the pliers 3 will be moved, as a whole, to bend back the part 14 away from the contiguous surface of the rim 12.

Likewise part 15 of the bridge piece 11 will be gripped and bent back and away from said rim 12.

These pliers will be found very useful in every optical repair shop for the special work above mentioned.

Having thus described my invention what I claim as new and desire to secure by Letters Patent is:

1. In a pair of optical pliers for eye glasses, a pair of lever arms having recesses, whereby to fit together, jaws formed by said lever arms, whereby to co-operate with each other, one of said jaws having a longitudinal open recess adapted to straddle the bow part of the bridge piece of said glasses, said jaw also having a semicircular recess to support other parts of said glasses, and the other jaw having a curved hook, whereby to engage and release the metallic part of said bridge piece.

2. In a pair of optical pliers for eye glasses, a pair of lever arms, recesses formed in said arms, whereby to adapt said arms to fit together in a pivotal manner, jaws formed by said lever arms, whereby to cooperate with each other, one of said jaws having a longitudinal open recess adapted to straddle the bow part of the bridge piece of said glasses, said jaw also having a semicircular recess to support other parts of said glasses, and the other jaw having a curved hook, whereby to engage and release the metallic part of said bridge piece.

In testimony whereof I have affixed my signature.

JOHN E. HUGHES.